(12) United States Patent
Mori

(10) Patent No.: US 7,027,797 B2
(45) Date of Patent: Apr. 11, 2006

(54) PORTABLE TERMINAL SYSTEM

(75) Inventor: Ukyo Mori, Tokyo (JP)

(73) Assignee: NEC Corporation, Tokyo (JP)

( * ) Notice: Subject to any disclaimer, the term of this patent is extended or adjusted under 35 U.S.C. 154(b) by 721 days.

(21) Appl. No.: 09/938,113

(22) Filed: Aug. 23, 2001

(65) Prior Publication Data

US 2002/0028661 A1    Mar. 7, 2002

(30) Foreign Application Priority Data

Sep. 4, 2000    (JP)    ............................. 2000-267116

(51) Int. Cl.
*H04B 1/08*    (2006.01)
(52) U.S. Cl. .............. 455/350; 455/575.1; 379/433.02; 381/345
(58) Field of Classification Search ................ 381/163, 381/188, 345, 349, 351, 386, 387; 379/433.02, 379/428.04, 420.01, 420.02; 455/149, 350, 455/90, 575
See application file for complete search history.

(56) References Cited

U.S. PATENT DOCUMENTS

| | | | |
|---|---|---|---|
| 5,655,017 A * | 8/1997 | Fishman | ................ 379/420.02 |
| 5,790,679 A * | 8/1998 | Hawker et al. | ............. 381/163 |
| 5,796,822 A * | 8/1998 | Larson et al. | .......... 379/433.02 |
| 5,883,966 A * | 3/1999 | Kubo | ......................... 381/386 |
| 6,151,206 A * | 11/2000 | Kato et al. | ................... 361/681 |
| 6,321,070 B1 * | 11/2001 | Clark et al. | .............. 455/575.1 |
| 6,697,495 B1 * | 2/2004 | Youn | .......................... 381/333 |
| 6,758,303 B1 * | 7/2004 | Zurek et al. | ................ 181/155 |
| 6,829,198 B1 * | 12/2004 | Janus et al. | ................. 367/163 |

FOREIGN PATENT DOCUMENTS

| | | |
|---|---|---|
| CN | 1215296 A | 4/1999 |
| EP | 0 663 749 A1 | 7/1995 |
| JP | 61-52957 | 4/1986 |
| JP | 4-298126 | 10/1992 |
| JP | 11-289365 | 10/1999 |
| WO | WO/PCT 99/03250 | 1/1999 |
| WO | WO/PCT 01/29910 A1 | 4/2001 |

* cited by examiner

*Primary Examiner*—Fan Tsang
*Assistant Examiner*—Olisa Anwah
(74) *Attorney, Agent, or Firm*—Dickstein, Shapiro, Morin & Oshinsky, LLP.

(57) ABSTRACT

In a portable terminal system having a portable terminal device and an external speaker 6 for converting electrical signals from the portable terminal device to electrical signals, the portable terminal device 21 and the external speaker portion 19 are equipped with first and second connectors 20, 2, and by electrically connecting the first and second connectors, the electrical signals from the portable terminal device are transmitted to the external speaker 6. The first connector 20 and the external speaker 6 are provided with transmission holes 18, 8 for transmitting to the portable terminal device side the sound wave signal converted on the basis of the electrical signals by the external speaker 6.

6 Claims, 5 Drawing Sheets

PORTABLE TERMINAL SYSTEM

BACKGROUND OF THE INVENTION

1. Field of the Invention

The present invention relates to a portable terminal system equipped with a portable terminal device such as a portable phone (cellular phone) or the like, and an external speaker for converting electrical signals from the portable terminal device to sound wave signals.

2. Description of Related Art

Various portable terminal devices represented by cellular phones have been hitherto required to be enhanced in the sound quality of voices from communication partners and call receiving sounds and also more miniaturized in size. In order to miniaturize a portable terminal device, it is required to reduce the size and thickness of a built-in speaker of the portable terminal device.

As the reduction in size and thickness of the built-in speaker is promoted, the sound quality of the voices of communication partners and the call receiving sounds is more degraded, and also the sound volume is more lowered. Besides, the requirement of miniaturizing the portable terminal device makes it difficult to increase of the size of the built-in speaker. Therefore, there is known a technique of securing an external speaker to a portable terminal device without installing the built-in speaker in the portable terminal device.

According to this technique, the external speaker is secured to the portable terminal device, and thus it is required to perform wire connection to a signal side terminal and a ground side terminal in order to connect the external speaker and the portable terminal device to each other. Further, an enclosure for the external speaker is needed to be newly provided. As a result, there is a case that a portable terminal system having a portable terminal device and an external speaker must be designed in a large size.

SUMMARY OF THE INVENTION

Therefore, an object of the present invention is to provide a compact-size portable terminal system equipped with an external speaker.

In order to attain the above object, according to the present invention, a portable terminal system comprising:

a portable terminal device including a housing and a first connector;

an external speaker portion for converting electrical signals from the portable terminal device to sound wave signals, the external speaker portion including an external speaker and a second connector;

transmission holes through which the sound wave signals converted from the electrical signals by the external speaker are transmitted to the portable terminal device, the transmission holes being formed in the first connector and the external speaker;

wherein the first and second connectors are electrically connected to each other to transmit the electrical signals from the portable terminal device to the external speaker.

According to the portable terminal device system of the present invention, the first and second connectors are equipped to the portable terminal device system, so that it is unnecessary to carry out wire connection to the signal side terminal and the ground side terminal. Further, according to the portable terminal device system of the present invention, by providing the transmission holes, the portable terminal device is used as an enclosure for the external speaker.

DETAILED DESCRIPTION OF THE PREFERRED EMBODIMENTS

Preferred embodiments according to the present invention will be described with reference to the accompanying drawings.

(First Embodiment)

Figure 1:
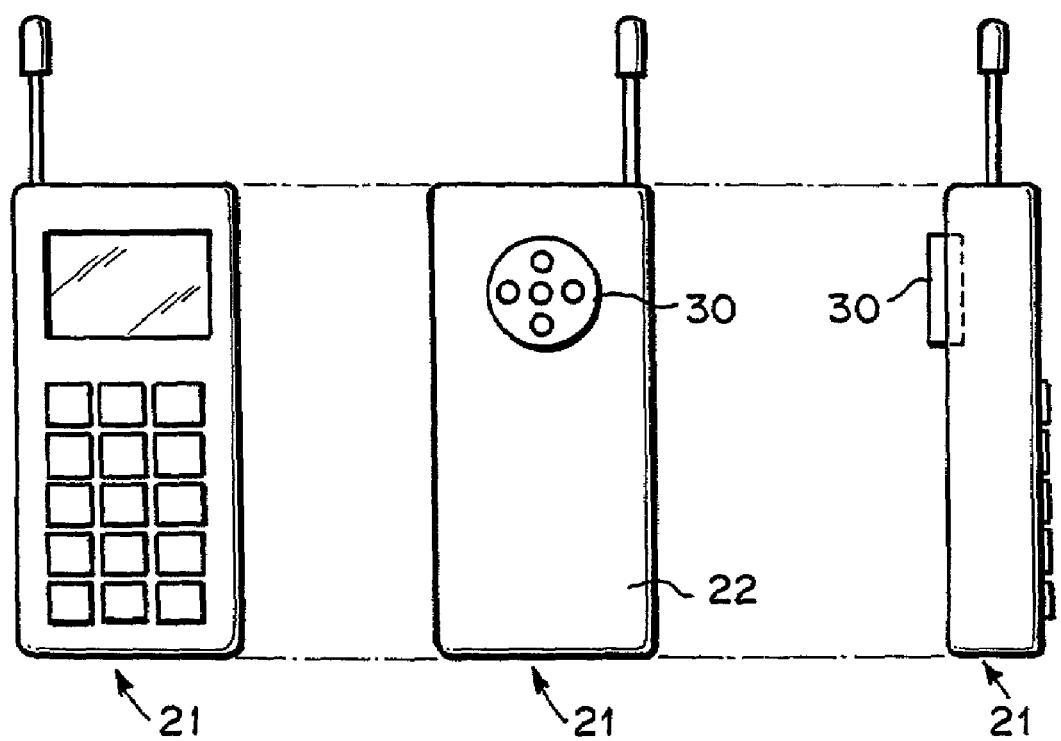
FIG. 1 is a schematic diagram showing the outlook of a portable terminal system according to a first embodiment of the present invention.

FIG. 1 is a schematic diagram showing the outlook of a portable terminal system according to a first embodiment of the present invention.

In this embodiment, speaker system 30 is mounted on the case back surface (the back surface of the housing) 22 of portable terminal device 21 such as a cellular phone, PHS (Personal Handy-phone System), a transceiver or the like as shown in FIG. 1. The mount position of the speaker system 30 is set to the case back surface 22 because it does not disturb the operation of the portable terminal device 21. The mount position of the speaker system 30 may be mounted on the side surface (the side surface of the housing) of the portable terminal device 21.

When the portable terminal system is designed so that the speaker system 30 can be mounted at the upper portion of the case back surface 22 as shown in FIG. 1, a user's hand by which the portable terminal device 21 is gripped is prevented from abutting against the speaker system 30 when the portable terminal device is under a telephone call or under operation. Therefore, it is easily for a user to hold the portable terminal device 21.

Figure 2:
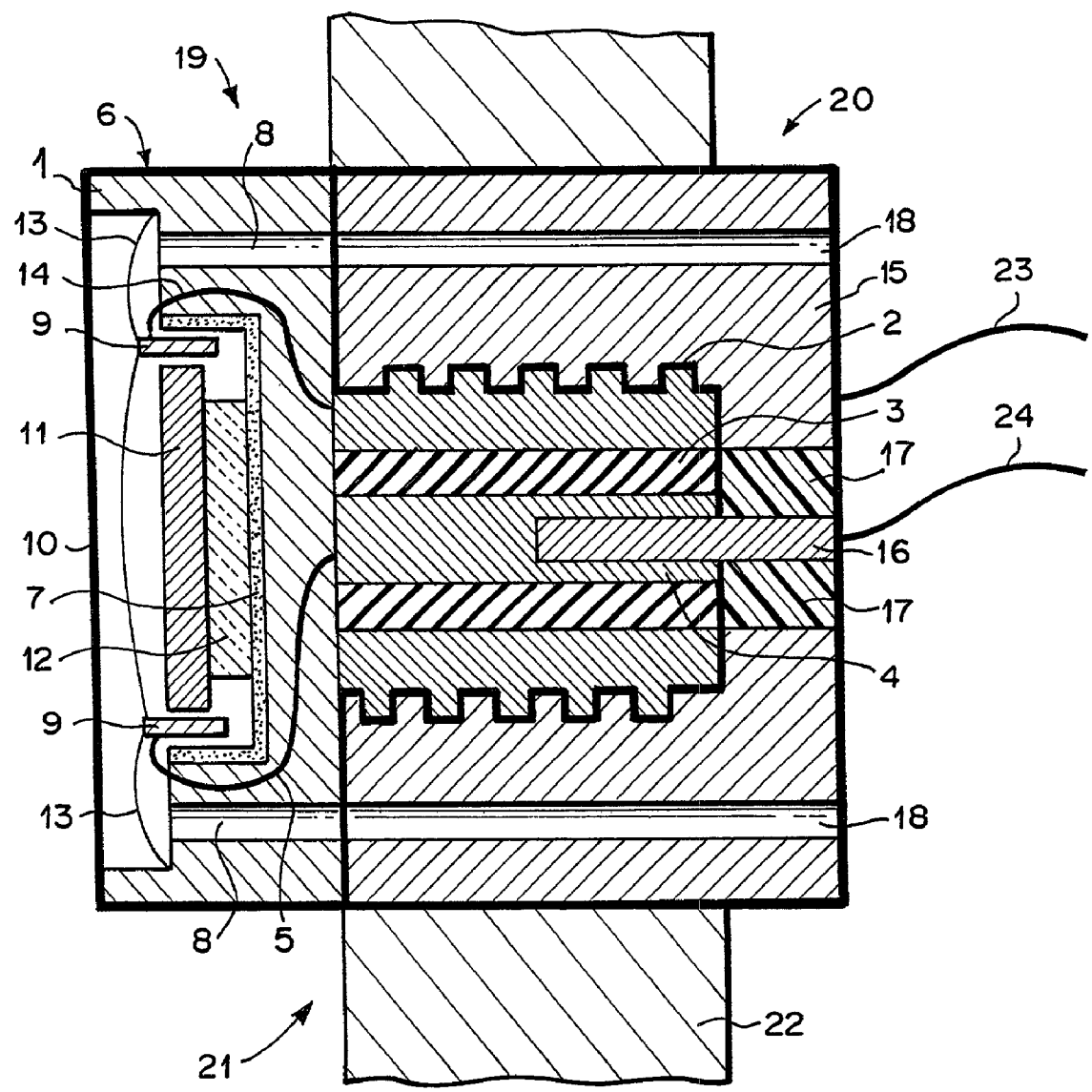
FIG. 2 is a cross-sectional view showing the back surface of a case in the vicinity of a speaker system of FIG. 1.
Figure 3A:
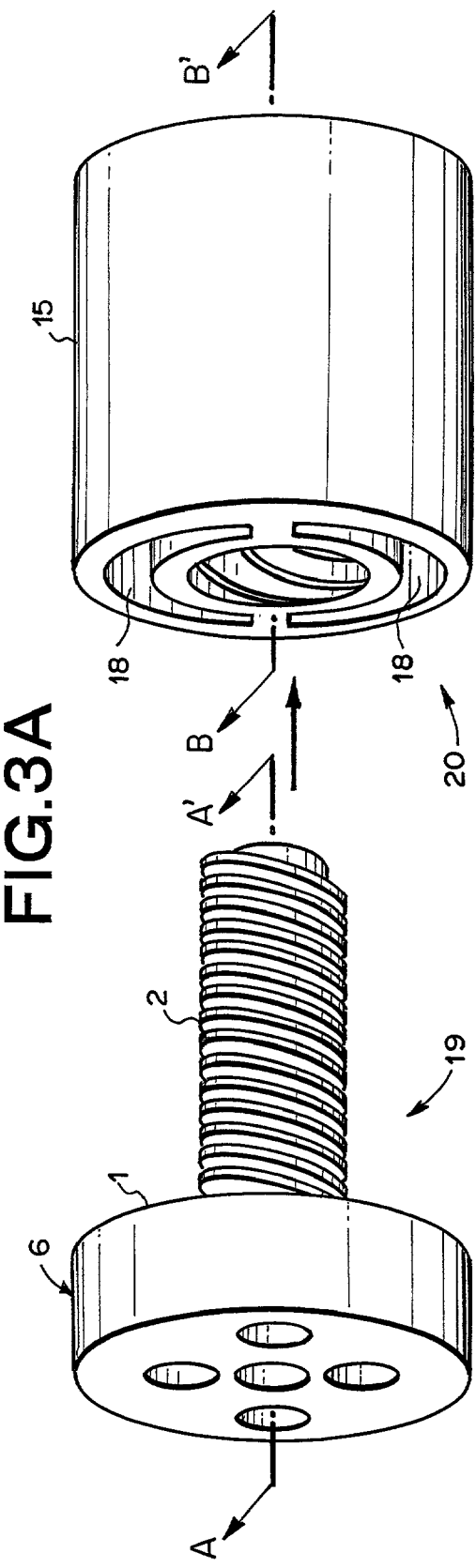
FIG. 3 is an exploded perspective view showing the speaker system of FIG. 1.
Figure 3B:
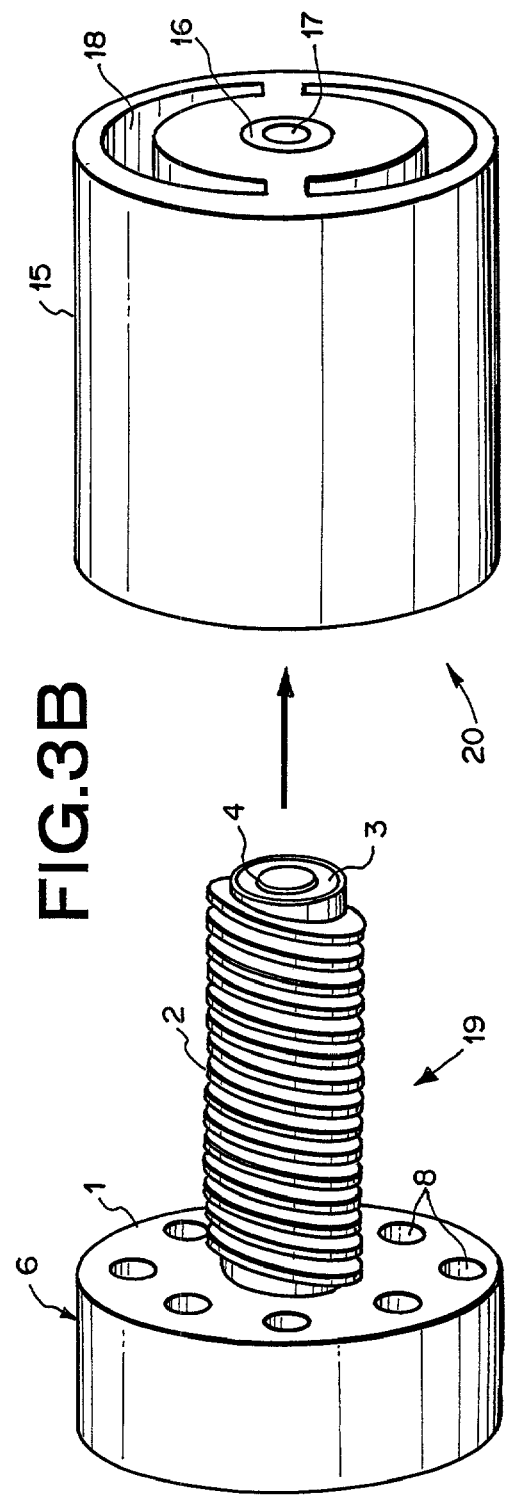
Figure 4A:
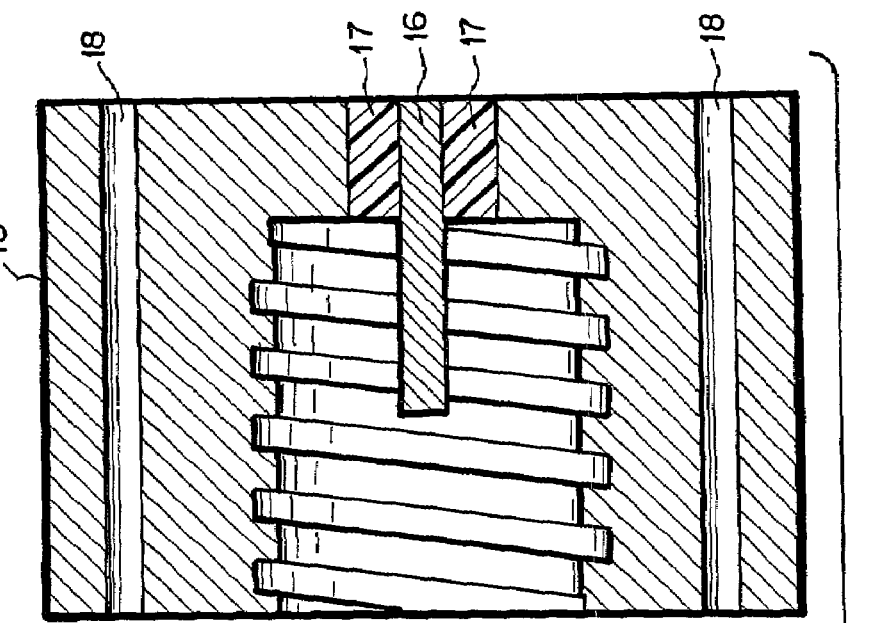
FIG. 4 is a cross-sectional view of FIG. 3.
Figure 4B:
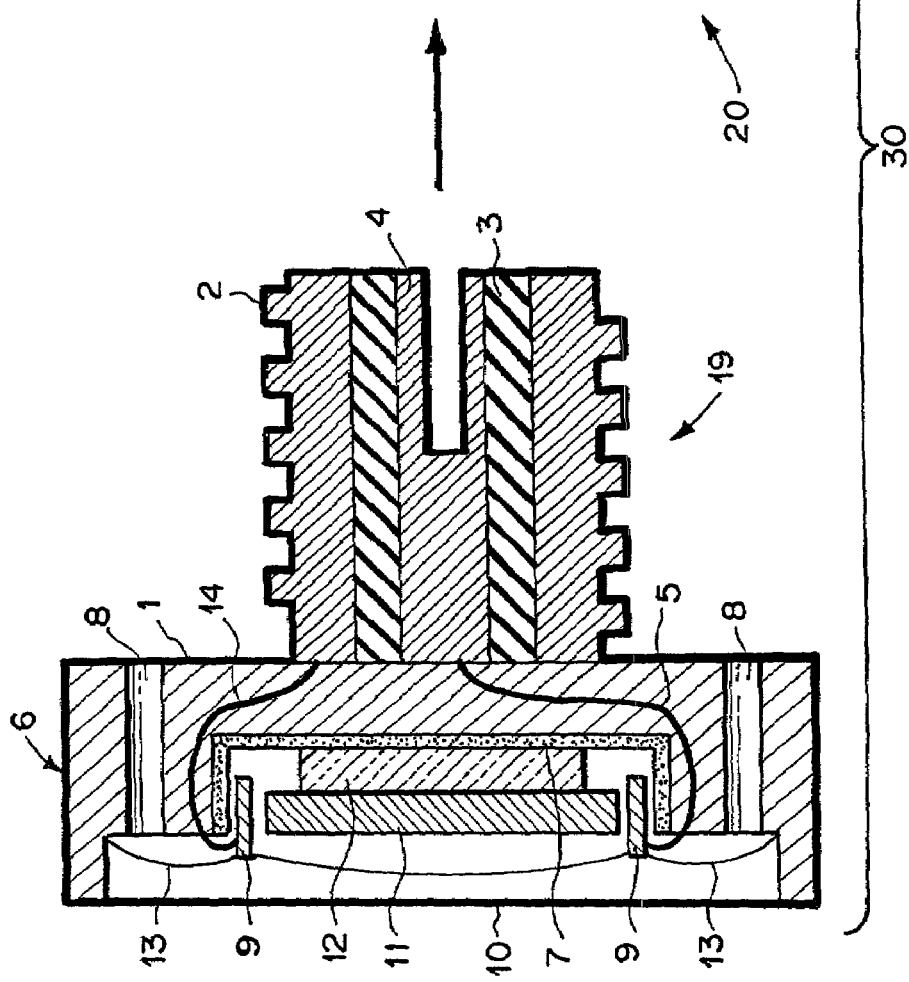

FIG. 2 is a cross-sectional view showing the case back surface 22 in the vicinity of the speaker system 30 of FIG. 1. FIGS. 3A and 3B are exploded perspective views showing the speaker system 30. FIGS. 4A and 4B are cross-sectional views taken along the A–A' direction of FIG. 3A and the B–B' direction of FIG. 3B, respectively.

The speaker system 30 includes external speaker portion 19 and reception side connector 20. In this embodiment, a screw thread is formed on the terminal 2 of the external speaker portion 19 (second connector), and a threaded aperture corresponding to the screw thread is formed in the reception-side connector 20 (first connector). Through the engagement between the screw thread and the threaded aperture, the external speaker portion 19 and the reception-side connector 20 are electrically connected to each other to transmit electrical signals from the portable terminal device 21 to the external speaker portion 19. The portable terminal device 21 includes a case (a housing) and the reception-side connector 20 (first connector).

In the above embodiment, the screw thread is formed at the external speaker portion side, and the threaded aperture corresponding to the screw thread is formed at the reception-side connector side. However, the screw thread may be formed at the reception-side connector side while the threaded aperture corresponding to the screw thread is formed at the external speaker portion side. In short, the screw thread and the threaded aperture may be formed in any way insofar as the external speaker portion 19 and the reception-side connector 20 can be firmly connected to each other through the engagement.

As shown in FIG. 2, the external speaker portion 19 is equipped with dynamic speaker 6 including voice coil 9 through which signal current flows, magnet 12 for generating magnetic flux, poll piece 11 for regulating the direction of the magnetic flux inside the voice coil 9, yoke 7 for regulating the direction of the magnetic flux outside the voice coil 9, vibrating plate 13 for radiating sound wave signals, baffle 10 for enabling the sound wave signals of a low frequency band to be excellently radiated, air hole 8 serving as a transmission hole for transmitting the sound wave signals to the portable terminal device 21, and an insulating frame 1 for fixing the above elements.

The external speaker portion 19 further includes insulator 3 which is physically coupled to the terminals 2, 4 and the frame 1 and electrically insulates the terminals 2 and 4 from each other, and conducting wires 14, 5 which are provided in the frame 1 and used to connect the terminals 2, 4 to the voice coil 9 respectively. The conducting wires 14, 5 are connected to different ends of the voice coil 9.

The reception-side connector 20 includes insulator 17 which is physically coupled to the terminals 15, 16 and electrically insulates the terminals 15 and 16 from each other, air hole 18 serving as a transmission hole formed so as to confront the air hole 8, conducting wire 23 for electrically connecting the terminal 15 to the ground side of the output signal, and conducting wire 24 for electrically connecting the terminal 16 to the signal side of the output signal.

In FIGS. 3A and 3B, the air hole 18 is designed in an U-shape. However, the shape of the air hole 18 is not limited to the U shape, and the air hole 18 may be designed in any shape insofar as the sound wave signals transmitted through the air hole 8 reach the portable terminal device 21 when the external speaker portion 19 and the reception-side connector 20 are threaded with each other.

As shown in FIG. 2, when the external speaker portion 19 and the reception-side connector 20 are threaded with each other, the terminal 2 and the terminal 15 are electrically connected to each other while the terminal 4 and the terminal 16 are electrically connected to each other. Under this state, the sound wave signals converted by the dynamic speaker 6 are allowed to be transmitted through the air hole 8 and the air hole 18 to the portable terminal device 21 by using air as sound medium.

Therefore, when the ground-side signals corresponding to voices received from a conductor (not shown) by the portable terminal device 21 or the ground-side signals corresponding to a call reception sound are transmitted, the ground-side signal flow through the conducting wire 23, the terminals 15, 2 and the conducting wire 14 into the voice coil 9. Further, when the electrical signals corresponding to voices received from a conductor (not shown) by the portable terminal device 21 or the electrical signals corresponding to a call reception sound are transmitted, the electrical signals flows through the conducting wire 24, the terminals 16, 4 and the conducting wire 5 into the voice coil 9.

When these signals flow into the voice coil 9, force is applied to the voice coil 9 on the basis of Fleming's left-hand rule, and the vibration plate 13 directly connected to the voice coil 9 is vibrated. According to the above procedure, the dynamic speaker 6 is driven to convert the electrical signals from the portable terminal device 21 to the sound wave signals and radiate the sound wave signals. The sound wave signals converted by the dynamic speaker 6 are transmitted through the air holes 8 and 19 to the portable terminal device 21. At this time, the portable terminal device 21 is used as an enclosure of the external speaker 6.

(Second Embodiment)

Figures 5A, 5B:
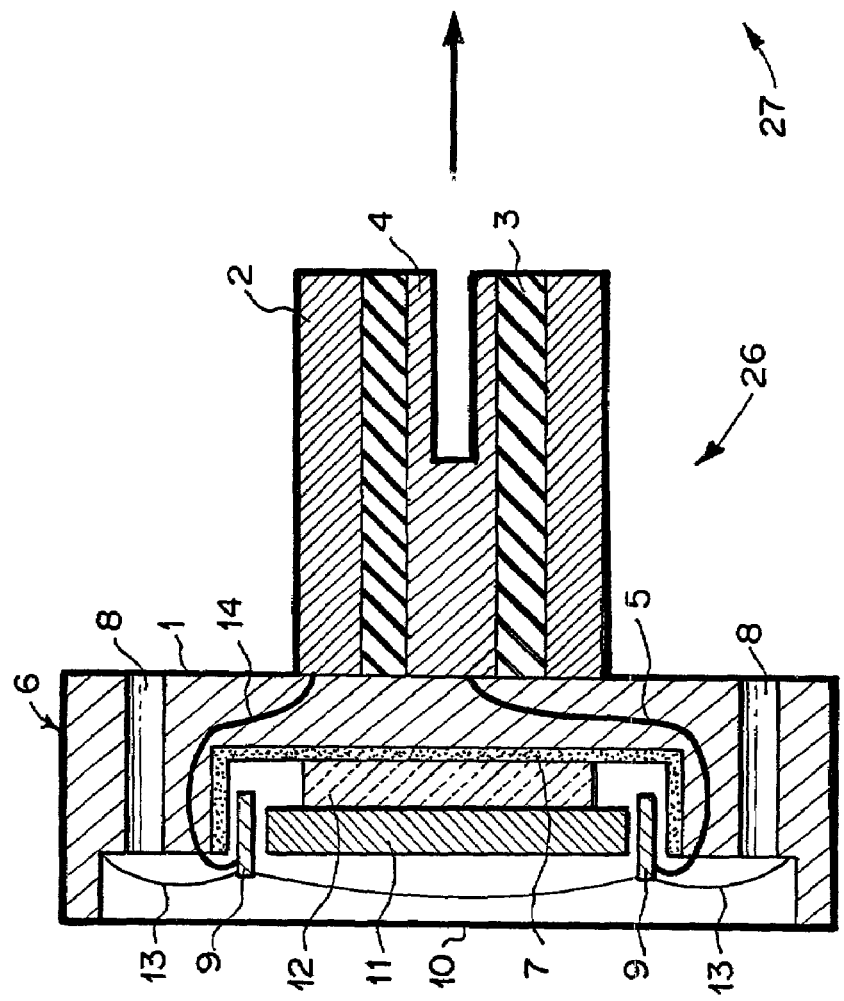
FIG. 5 is an exploded cross-sectional view showing a speaker system of a portable terminal system according to a second embodiment of the present invention.

FIGS. 5A and 5B are exploded cross-sectional views showing a speaker system according to a portable terminal system of a second embodiment of the present invention, and they correspond to FIGS. 4A and 4B. In FIGS. 5A and 5B, the same elements as FIGS. 4A and 4B are represented by the same reference numerals.

According to this embodiment, as shown in FIGS. 5A and 5B, the external speaker portion 26 and the reception-side connector 27 can be fixed to each other by the friction force of the contact face between the terminals 4 and 16 and the friction force of the contact face between the terminals 24 and 25. With this structure, it is unnecessary to provide a screw thread and a threaded aperture to the external speaker portion 26 and the reception-side connector 27, and thus the number of manufacturing steps can be reduced.

It is preferable that by providing a spring to the terminal 16, the strength in physical contact and electrical connection between the terminals 4 and 16 is enhanced when the external speaker portion 19 and the reception-side connector 20 are threaded to each other.

As described above, according to the present invention, the housing of the portable terminal device and the external speaker are equipped with the first and second connector respectively, with which the portable terminal device and the external speaker can be electrically connected, and the first connector and the external speaker are equipped with the transmission holes through which the sound wave signals generated by the external speaker are transmitted to the portable terminal device side. Therefore, it is unnecessary to especially carry out the wire connection to the signal-side terminal and the ground-side terminal and also newly provide the enclosure. Therefore, the portable terminal system can be miniaturized.

What is claimed is:

1. A portable terminal system comprising:
    a portable terminal device including a housing and a first connector;
    an external speaker portion for converting electrical signals from said portable terminal device to sound wave signals, said external speaker portion including an external speaker and a second connector;
    transmission holes through which the sound wave signals converted from the electrical signals by said external speaker are transmitted to said portable terminal device, said transmission holes being formed in said first connector and said external speaker;
    wherein said first and second connectors are electrically connected to each other to transmit the electrical signals from said portable terminal device to said external speaker.

2. The portable terminal system as claimed in claim 1, wherein said first connector is located at such a position that a hand is not brought into contact with said first connector when said portable terminal device is operated.

3. The portable terminal system as claimed in claim 1, wherein said first connector is provided on the back surface of said portable terminal device.

4. The portable terminal system as claimed in claim 1, wherein said first and second connectors are designed to have a screw thread and a threaded aperture, or a threaded aperture and a screw thread respectively so that said external speaker portion and said portable terminal device can be threaded to each other.

5. The portable terminal system as claimed in claim 1, wherein said external speaker portion and said portable terminal device are connected to each other by the friction force of the contact face between said first and second connectors.

6. The portable terminal system as claimed in claim 1, wherein said portable terminal device is used as an enclosure of said external speaker.

\* \* \* \* \*